United States Patent
Chang

(10) Patent No.: US 9,024,911 B2
(45) Date of Patent: May 5, 2015

(54) METHOD AND DEVICE FOR DETECTING CAPACITIVE TOUCH SCREEN

(75) Inventor: Chin-Fu Chang, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 372 days.

(21) Appl. No.: 13/545,291

(22) Filed: Jul. 10, 2012

(65) Prior Publication Data

US 2013/0307814 A1 Nov. 21, 2013

Related U.S. Application Data

(60) Provisional application No. 61/648,710, filed on May 18, 2012.

(51) Int. Cl.
*G06F 3/045* (2006.01)
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ........ G06F 3/044; G06F 3/0416; G06F 3/047
USPC .................................................. 345/173–178
See application file for complete search history.

(56) References Cited

U.S. PATENT DOCUMENTS

| | | | | |
|---|---|---|---|---|
| 6,075,520 A * | 6/2000 | Inoue et al. | | 345/173 |
| 8,040,142 B1 * | 10/2011 | Bokma et al. | | 324/658 |
| 8,054,296 B2 * | 11/2011 | Land et al. | | 345/173 |
| 8,427,444 B2 * | 4/2013 | Wu et al. | | 345/173 |
| 8,704,798 B2 * | 4/2014 | Chang | | 345/174 |
| 8,773,146 B1 * | 7/2014 | Hills et al. | | 324/658 |
| 8,786,356 B2 * | 7/2014 | Siska | | 327/517 |
| 2007/0291011 A1 * | 12/2007 | Chang | | 345/173 |
| 2007/0291012 A1 * | 12/2007 | Chang | | 345/173 |
| 2008/0001072 A1 * | 1/2008 | Chang | | 250/221 |
| 2008/0062140 A1 * | 3/2008 | Hotelling et al. | | 345/173 |
| 2008/0158174 A1 * | 7/2008 | Land et al. | | 345/173 |
| 2008/0179112 A1 * | 7/2008 | Qin et al. | | 178/18.06 |
| 2009/0166097 A1 * | 7/2009 | Chang | | 178/18.03 |
| 2009/0211817 A1 * | 8/2009 | Chang et al. | | 178/18.01 |
| 2009/0255737 A1 * | 10/2009 | Chang et al. | | 178/18.06 |
| 2010/0066692 A1 * | 3/2010 | Noguchi et al. | | 345/173 |

(Continued)

FOREIGN PATENT DOCUMENTS

| | | |
|---|---|---|
| TW | 201036171 | 10/2010 |
| TW | 201115444 | 5/2011 |

*Primary Examiner* — Quan-Zhen Wang
*Assistant Examiner* — Chun-Nan Lin
(74) *Attorney, Agent, or Firm* — WPAT, PC; Justin King

(57) ABSTRACT

A detecting device and method for a capacitive touch screen is proposed. A plurality of frequency settings is employed. Each frequency setting corresponds to a type of driving mode of a type of driving potential. These frequency settings are used for setting the detecting device for the capacitive touch screen. When the signal-to-noise (S/N) ratio of the signals in the capacitive touch screen is not appropriate, frequency settings are changed by selecting one that yields a more appropriate S/N ratio among the frequency settings. The driving mode includes a single-electrode driving mode in which only a single driving electrode in the capacitive touch screen is driven at a time, and a multiple-electrode driving mode in which multiple driving electrodes are simultaneously driven at a time, and there can be several types of driving potentials.

26 Claims, 8 Drawing Sheets

(56) References Cited

U.S. PATENT DOCUMENTS

| | | | |
|---|---|---|---|
| 2010/0244036 A1 | 9/2010 | Park et al. | |
| 2010/0259505 A1* | 10/2010 | Chang | 345/174 |
| 2010/0302198 A1* | 12/2010 | Tasher et al. | 345/173 |
| 2010/0327881 A1* | 12/2010 | Chang et al. | 324/658 |
| 2011/0084924 A1* | 4/2011 | Chang et al. | 345/173 |
| 2011/0084926 A1* | 4/2011 | Chang et al. | 345/173 |
| 2011/0084927 A1* | 4/2011 | Chang et al. | 345/173 |
| 2011/0084928 A1* | 4/2011 | Chang et al. | 345/173 |
| 2011/0084929 A1* | 4/2011 | Chang et al. | 345/173 |
| 2011/0084930 A1* | 4/2011 | Chang et al. | 345/173 |
| 2011/0084931 A1* | 4/2011 | Chang et al. | 345/173 |
| 2011/0084936 A1* | 4/2011 | Chang et al. | 345/174 |
| 2011/0084937 A1* | 4/2011 | Chang et al. | 345/174 |
| 2012/0194476 A1 | 8/2012 | Lee et al. | |
| 2013/0009906 A1* | 1/2013 | Posamentier | 345/174 |
| 2013/0120310 A1 | 5/2013 | Siska | |
| 2013/0307814 A1 | 11/2013 | Chang | |
| 2013/0321331 A1* | 12/2013 | Chang | 345/174 |
| 2014/0145998 A1* | 5/2014 | Liu et al. | 345/174 |
| 2014/0240271 A1* | 8/2014 | Land et al. | 345/173 |

\* cited by examiner

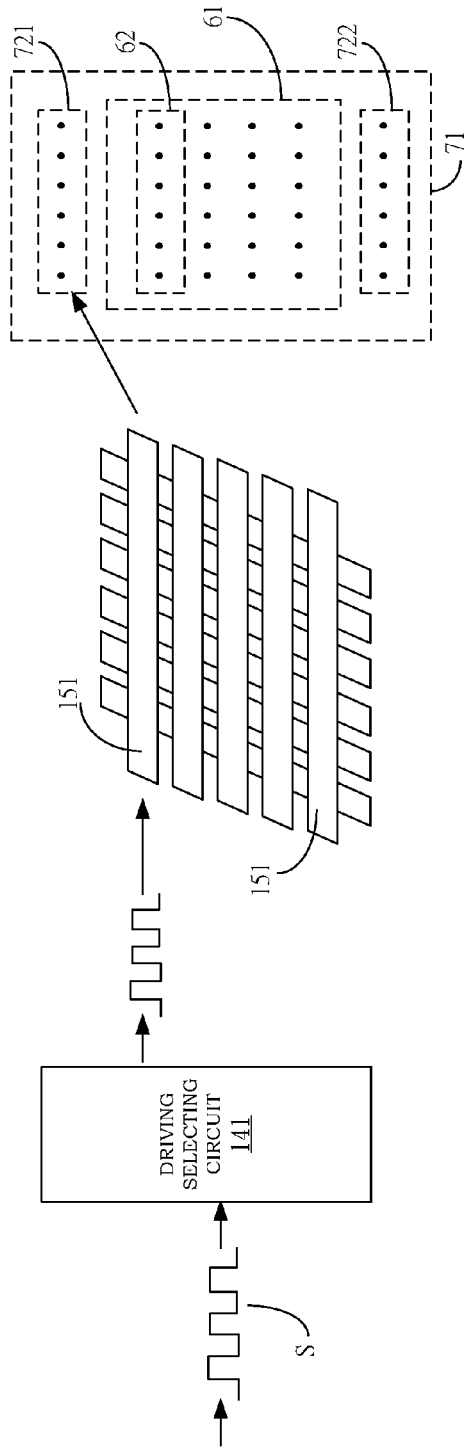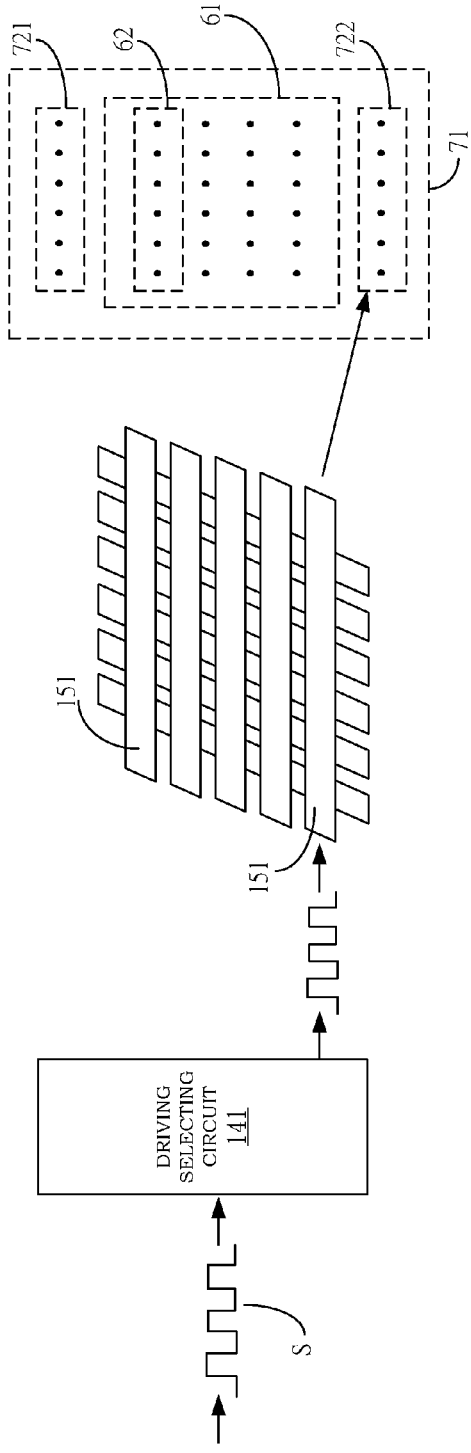

METHOD AND DEVICE FOR DETECTING CAPACITIVE TOUCH SCREEN

CROSS REFERENCE TO RELATED APPLICATIONS

This application claims the benefit of U.S. Provisional Application No. 61/648, 710, filed on May 18, 2012, which are herein incorporated by reference for all intents and purposes.

BACKGROUND OF THE INVENTION

1. Field of the Invention

The present invention relates to a detecting method and device for capacitive touch screens, and more particularly, to a detecting device and method for capacitive touch screens that improves the signal-to-noise ratio by switching between frequencies.

2. Description of the Prior Art

A capacitive touch screen determines the locations of touches made by a human body thereon based on changes in detected signals due to its capacitive coupling with the body. When the human touches the screen, noise surrounding the human body also adds to the capacitive coupling between the human body and the capacitive touch screen, and thus causing changes in the detected signals. Moreover, since noise is not constant, it cannot be easily determined. When the signal to noise ratio (S/N ratio) is relatively small, a touch may not be detected, or the location of the touch may not be accurately detected.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

An objective of the present invention is to address the inappropriate S/N ratio of the capacitive touch screen caused by noise coming from a human body. The present invention therefore proposes a detecting device and method for a capacitive touch screen that employs a plurality of frequency settings. Each frequency setting corresponds to a type of driving mode of a type of driving potential. These frequency settings are used for setting in the detecting device for the capacitive touch screen. When it is detected that the S/N ratio of the signals in the capacitive touch screen is not appropriate, frequency settings are changed by selecting one that yields a more appropriate S/N ratio among the frequency settings. The driving mode includes a single-electrode driving mode in which only a single driving electrode in the capacitive touch screen is driven at a time, and a multiple-electrode driving mode in which multiple driving electrodes are simultaneously driven at a time, and there can be several types of driving potentials. Different frequency settings impose different power consumptions on the system. A frequency setting with a tolerable S/N ratio and low power consumption can be preferentially chosen.

Said and other objectives of the present invention and the solutions for the prior-art problems are achieved by the following technical schemes. A detecting device for a capacitive touch screen proposed by the present invention includes: a storage circuit for storing a plurality of frequency settings based on a level of power consumption, each frequency setting corresponding to a type of driving mode of a type of driving potential, and each frequency setting including a frequency and a set of parameters, wherein there is at least one type of driving potential; a driving circuit for providing a driving signal to at least one driving electrode of the capacitive touch screen according to a working frequency, wherein the capacitive touch screen includes a plurality of driving electrodes and a plurality of detecting electrodes crossing each other at a plurality of intersections; and a detecting circuit including initializing settings of the detecting circuit based on the set of parameters of one of the frequency settings; detecting signals from the detecting electrodes based on a set of parameters of the detecting circuit and generating a 1D sensing information based on the signals from the detecting electrodes; determining if noise interference exceeds a tolerable range based on the 1D sensing information; and if the noise interference exceeds a tolerable range, including: sequentially changing the working frequency and the settings of the detecting circuit based on the frequency and the set of parameters of one of the frequency settings and thereafter generating a 1D sensing information and determining if the noise interference still exceeds a tolerable range based on the 1D sensing information until the noise interference does not exceed the tolerable range; or sequentially changing the working frequency and the settings of the detecting circuit based on the frequency and the set of parameters of each of the frequency settings and thereafter generating a 1D sensing information and determining if the noise interference still exceeds a tolerable range based on the 1D sensing information, and changing the working frequency and the settings of the detecting circuit to the frequency and the set of parameters of the frequency setting that has the lowest noise interference.

Said and other objectives of the present invention and the solutions for the prior-art problems are achieved by the following technical schemes. A detecting method for a capacitive touch screen proposed by the present invention includes: storing a plurality of frequency settings based on a level of power consumption, each frequency setting corresponding to a type of driving mode of a type of driving potential, and each frequency setting including a frequency and a set of parameters, wherein there is at least one type of driving potential; providing a driving signal to at least one driving electrode of the capacitive touch screen according to a working frequency, wherein the capacitive touch screen includes a plurality of driving electrodes and a plurality of detecting electrodes crossing each other at a plurality of intersections; and initializing settings of a detecting circuit based on the set of parameters of one of the frequency settings; detecting signals from the detecting electrodes based on a set of parameters of the detecting circuit and generating a 1D sensing information based on the signals from the detecting electrodes; determining if noise interference exceeds a tolerable range based on the 1D sensing information; and if the noise interference exceeds a tolerable range, including: sequentially changing the working frequency and the settings of the detecting circuit based on the frequency and the set of parameters of one of the frequency settings and thereafter generating a 1D sensing information and determining if the noise interference still exceeds a tolerable range based on the 1D sensing information until the noise interference does not exceed the tolerable range; or sequentially changing the working frequency and the settings of the detecting circuit based on the frequency and the set of parameters of each of the frequency settings and thereafter generating a 1D sensing information and determining if the noise interference still exceeds a tolerable range based on the 1D sensing information, and changing the working frequency and the settings of the detecting circuit to the frequency and the set of parameters of the frequency setting that has the lowest noise interference.

With the above technical schemes, the present invention at least has the following advantages and beneficial effects:

1. Noise interference is reduced by switching between different frequencies;

2. A power-saving frequency setting can be chosen to reduce the power consumption.

BRIEF DESCRIPTION OF THE DRAWINGS

FIGS. 7A and 7B are schematic diagrams illustrating the generation of an expanded image.

DETAILED DESCRIPTION OF THE PREFERRED EMBODIMENTS

Figure 1:
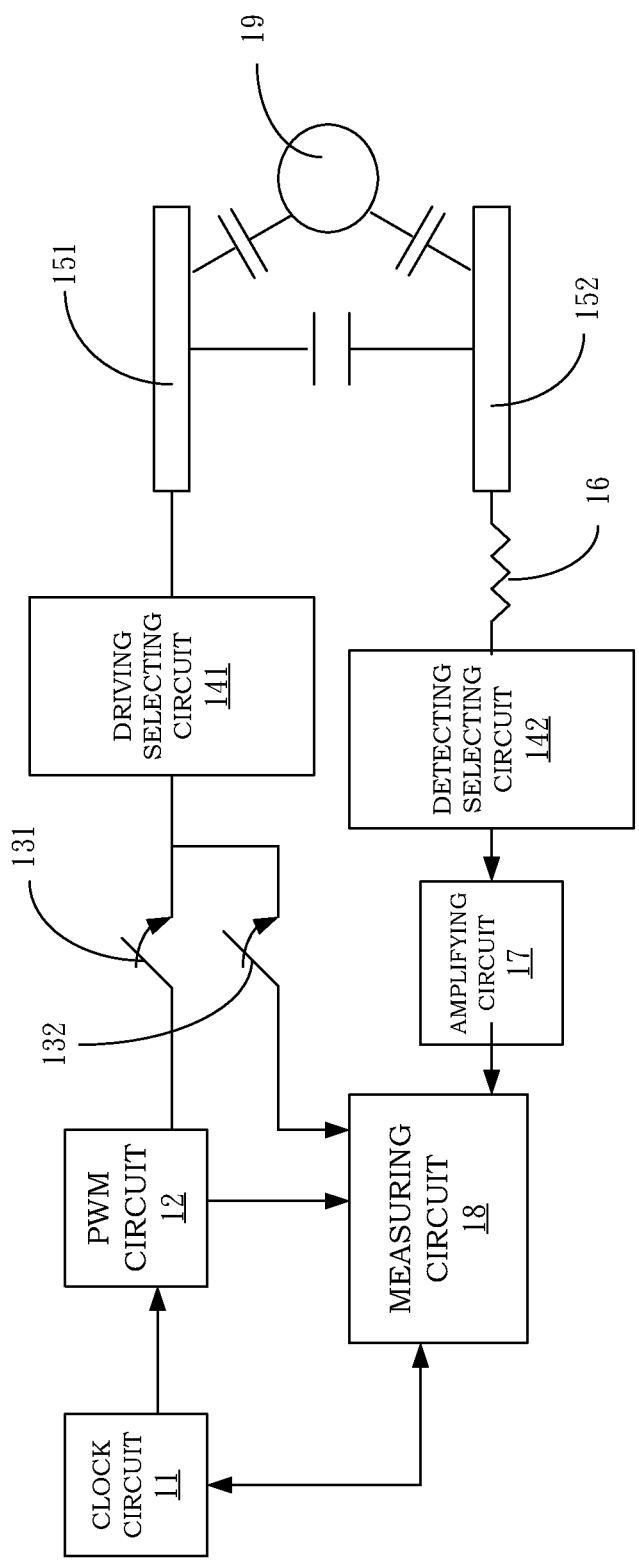
FIG. 1 and FIG. 4 are schematic diagrams illustrating capacitive touch screens and control circuits thereof according to the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Capacitive touch screens are vulnerable to noise, especially, that coming from the human body touching the screen. The present invention achieves the objective of reducing noise interference with an adaptive driving scheme.

In a capacitive touch screen, a plurality of electrodes arranged in rows and columns are used for detecting locations of the touches, in which power consumption is proportional to the number of simultaneously driven electrodes and the driving voltage. During touch detecting, noise may travel to the capacitive touch screen via the conductor touching the screen, degrading the signal to noise ratio (S/N ratio) and causing misjudgment of a touch or the location of a touch. In other words, the S/N ratio dynamically changes according to the object touching the screen as well as the surrounding environment.

Referring to FIG. 1, a schematic diagram illustrating a capacitive touch screen and a control circuit thereof according to the present invention is shown. It includes a clock circuit 11, a pulse width modulation (PWM) circuit 12, a driving switch 131, a detecting switch 132, a driving selecting circuit 141, a detecting selecting circuit 142, at least one driving electrode 151, at least one detecting electrode 152, a variable resistor 16, an amplifying circuit 17 and a measuring circuit 18. The capacitive touch screen may include the plurality of driving electrodes 151 and the plurality of detecting electrodes 152 crossing each other to form a plurality of intersections.

The clock circuit 11 provides a clock signal for the entire system based on a working frequency, and the PWM circuit 12 provides a PWM signal based on the clock signal and a PWM parameter to drive the driving electrodes 151. The driving switch 131 control the driving of the driving electrodes, and the selecting circuit 141 selects at least one driving electrode 151. In addition, the detecting switch 132 controls the electrical coupling between the driving electrodes and the measuring circuit 18. When the driving switch 131 is turned on, the detecting switch 132 is turned off, the PWM signal is provided via the driving selecting circuit 141 to driving electrode(s) 151 coupled by the driving selecting circuit 141, wherein there can be a plurality of driving electrodes 151, and the selected driving electrode(s) 151 can be one, two, or more. When a driving electrode 151 is driven by the PWM signal, capacitive coupling 152 will be generated at intersections of detecting electrodes 152 and the driving electrode 151 being driven, and each detecting electrode 152 will generate an input signal when capacitively coupled to the driving electrode 151. The variable resistor 16 provides impedance based on a resistor parameter, and the input signal is provided to the detecting selecting circuit 142 via the variable resistor 16. The detecting selecting circuit 142 selects one, two, three, multiple or all of the detecting electrodes 152 to couple with the amplifying circuit 17. The input signal is amplified by the amplifying circuit 17 based on a gain parameter and then provided to the measuring circuit 18. The measuring circuit 18 detects the input signal based on the PWM signal and the clock signal, wherein the measuring circuit 18 samples the detected signal with at least one phase based on a phase parameter. The measuring circuit 18 can, for example, include at least one integration circuit. Each integration circuit performs integration on an input signal in the input signal with at least one phase based on the phase parameter to measure the magnitude of the input signal. In an example of the present invention, each integration circuit performs integration on a pair of input signals in the input signal with at least one phase based on the phase parameter, or performs integration on the difference between signal differences of two pairs of input signals in the input signal with at least one phase based on the phase parameter. Moreover, the measuring circuit 18 may further include at least one analog-to-digital converter (ADC) to convert the detection result into a digital signal. In addition, it can be appreciated by one with ordinary skill in the art that the input signal can be first amplified by the amplifying circuit 17 before providing to the measuring circuit 18 by the detecting selecting circuit 142; the present invention is not limited as such.

In the present invention, capacitive touch screens have at least two types of driving modes: a power saving single-electrode driving mode, and a two-electrode driving mode, and have at least one driving potential. Each driving mode corresponding to a different driving potential has at least one working frequency. Each working frequency corresponds to a set of parameters. Each driving mode corresponding to a different driving potential represents power consumption of a different level.

Figure 2A:
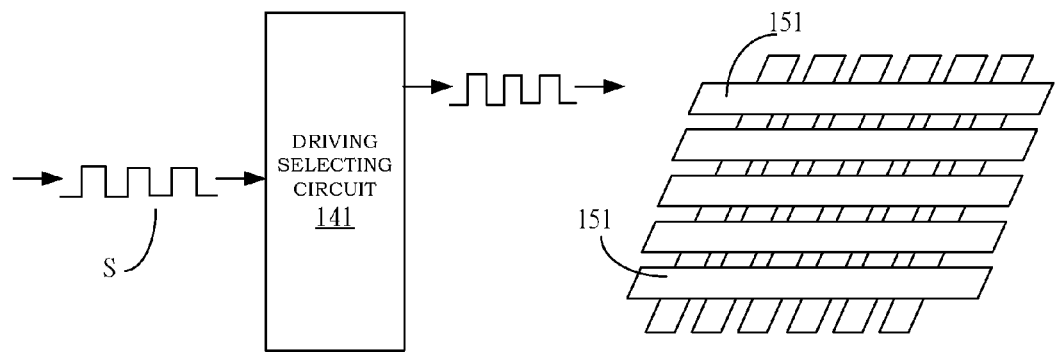
FIG. 2A is a schematic diagram illustrating a single-electrode driving mode.

The electrodes of a capacitive touch screen are divided into a plurality of driving electrodes and a plurality of detecting electrodes. The driving electrodes and the detecting electrodes cross each other at numerous intersections. Referring to FIG. 2A, in the single-electrode driving mode, driving electrodes are driven one at a time, that is, in any one instance, only a single driving electrode is provided with a driving signal S. When any driving electrode is driven, signals of all of the detecting electrodes are detected to generate one-dimensional (1D) sensing information. Accordingly, after all the driving electrodes are driven, 1D sensing information corresponding to every driving electrode is obtained, which together constitute a full image corresponding to all intersections.

Figure 2B:
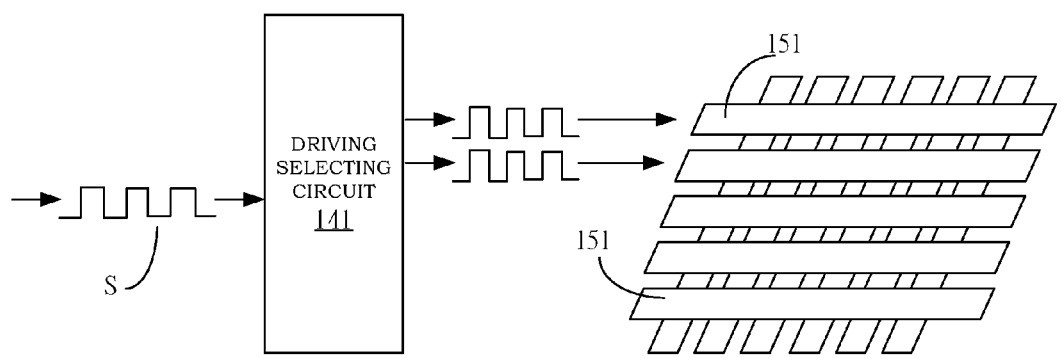
FIGS. 2B and 2C are schematic diagrams illustrating a two-electrode driving mode.
Figure 2C:
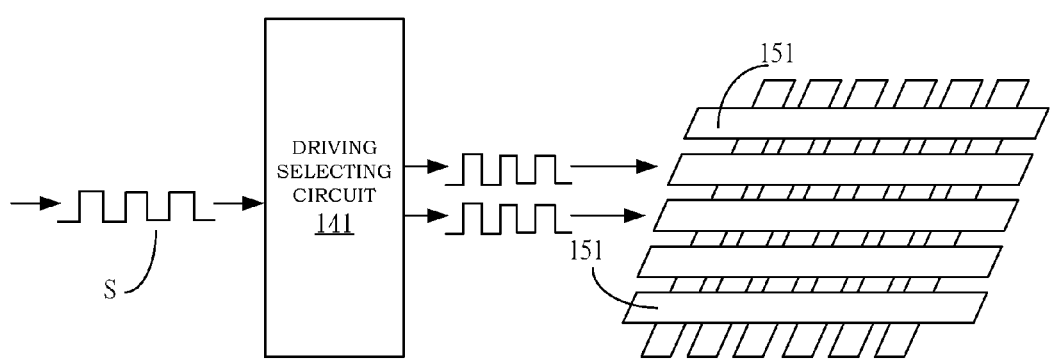

Referring to FIGS. 2B and 2C, in the two-electrode driving mode, a pair of adjacent driving electrodes is driven at a time. In other words, n driving electrodes require n−1 times of driving. When any pair of driving electrodes is driven, signals of all of the detecting electrodes are detected to generate 1D sensing information. For example, first, as shown in FIG. 2B, a driving signal S is simultaneously provided to a first pair of driving electrodes. Then, as shown in FIG. 2C, the driving signal S is simultaneously provided to a second pair of driving electrodes, and so on. Accordingly, after every pair (total of n−1 pairs) of driving electrodes are driven, 1D sensing information corresponding to every pair of driving electrodes is obtained, which together constitute a reduced image in comparison to the full image. The number of pixels of the reduced image is less than that of the pixels of the full image. In another example of the present invention, the two-electrode driving mode further includes perform single-electrode driving on electrodes at either end. When the electrodes at either end are driven, signals of all the detecting electrodes are detected to generate 1D sensing information, together they provide two 1D sensing information, which form an expanded image with the reduced image. For example, 1D sensing information corresponding to either side is placed outside the two sides of the reduced image to form the expanded image.

It can be appreciated by one with ordinary skill in the art that the present invention may also include three-electrode driving mode, four-electrode driving mode and the like, and they will not be further illustrated to avoid redundancy.

The driving potential may include, but is not limited to, at least two driving potentials, such as a low driving potential and a high driving potential. A higher driving potential has a higher S/N ratio.

According to the above, in the single-electrode driving mode, a full image can be obtained, whereas in the two-electrode driving mode, a reduced image and an expanded image can be obtained. The full image, the reduced image and the expanded image can be obtained before or when an external conductive object 19 approaches or touches the capacitive touch screen. The external conductive object 19 can be one or more. As mentioned before, when the external conductive object 19 approaches or touches the capacitive touch screen, or capacitive couples with the driving electrode(s) 151 and the detecting electrode(s) 152, noise interference may arise, even when the driving electrode 151 is not driven, the external conductive object 19 may still capacitive couple with the driving electrode(s) 151 and the detecting electrode(s) 152. Moreover, noise may interfere through some other routes.

Accordingly, the present invention provides a noise detecting process for detecting noise interference. During the noise detecting process, the driving switch 131 is turned off, and the detecting switch 132 is turned on, such that the measuring circuit can generate 1D sensing information of noise detection based on the signals of the detecting electrodes 152, thereby determining if the noise interference is within a tolerable range. For example, whether the noise interference is within the tolerable range can be determined by determining whether the 1D sensing information of noise detection exceeds a threshold, or whether the sum or the average of all the values of the 1D sensing information of noise detection exceeds a threshold. It can be appreciated by one with ordinary skill in the art that there are other ways of determining whether the noise interference is within the tolerable range based on the 1D sensing information of noise detection, which the present invention will not further illustrate.

The noise detecting process can be performed when the system is activated, or every time the full, the reduced, or the expanded image is obtained, or regularly or multiple times when the full, the reduced, or the expanded image is obtained, or when an approaching or touch by an external conductive object is detected. It can be appreciated by one with ordinary skill in the art that there are other suitable timings for performing the noise detecting process; the present invention is not limit to these.

The present invention further proposes a frequency switching process for switching frequencies when the noise interference exceeds the tolerable range. The measuring circuit is provided with several sets of frequency settings, which can be stored in a memory or other storage media and can be selected by the measuring circuit during the frequency switching process. The clock signal of the clock circuit 11 is thus controlled by the selected frequency. The frequency switching process may include selects a suitable frequency setting from the frequency settings, for example, sequentially uses a set of frequency setting and performs the noise detecting process until the noise interference is within the tolerable range. The frequency switching process may alternatively include selects the best frequency setting from the frequency settings, for example, sequentially uses a set of frequency setting and performs the noise detecting process, and selects the frequency setting with the least noise interference, for example, the frequency setting with the smallest maximum value of the 1D sensing information of noise detection, or the frequency setting with the smallest sum or average of all the values of the 1D sensing information of noise detection.

The frequency settings include, but are not limited to, a driving mode, a frequency and a set of parameters. The set of parameters may include, but is not limited to, said resistor parameter, said gain parameter, said phase parameter and said PWM parameter. It can be appreciated by one with ordinary skill in the art that there are other parameters suitable for the capacitive touch screen and its control circuit.

The frequency settings may include a plurality of driving potentials, such as a first driving potential and a second driving potential, as shown in Table 1 below. It can be appreciated by one with ordinary skill in the art that there can be three or more driving potentials. Each driving potential can be divided into several driving modes, including, but not limited to, single-electrode driving mode, two-electrode driving mode, three-electrode driving mode, four-electrode driving mode etc. Each driving mode of each driving potential includes a plurality of frequencies, each frequency corresponds to a set of parameters just mentioned. It can be appreciated by one with ordinary skill in the art that the frequencies of each driving mode corresponding to each driving potential may be entirely different, or partially the same; the present invention is not limited as such.

TABLE 1

| Driving Potential | Driving Mode | Frequency | Parameter Set |
|---|---|---|---|
| First driving potential | Single-electrode driving mode | First frequency | First parameter set |
|  |  | First frequency | First parameter set |
|  |  | . . . |  |
|  |  | $i^{th}$ frequency | $i^{th}$ parameter set |

TABLE 1-continued

| Driving Potential | Driving Mode | Frequency | Parameter Set |
|---|---|---|---|
| | Two-electrode driving mode | $i + 1^{th}$ frequency<br>$i + 2^{th}$ frequency<br>... | $i + 1^{th}$ parameter set<br>$i + 2^{th}$ parameter set<br>... |
| Second driving potential | Single-electrode driving mode | $j^{th}$ frequency<br>$j + 1^{th}$ frequency<br>$j + 2^{th}$ frequency<br>... | $j^{th}$ parameter set<br>$j + 1^{th}$ parameter set<br>$j + 2^{th}$ parameter set<br>... |
| | Two-electrode driving mode | $k^{th}$ frequency<br>$k + 1^{th}$ frequency<br>$k + 2^{th}$ frequency<br>... | $k^{th}$ parameter set<br>$k + 1^{th}$ parameter set<br>$k + 2^{th}$ parameter set<br>... |
| | | $n^{th}$ frequency | $n^{th}$ parameter set |

Figure 3A:
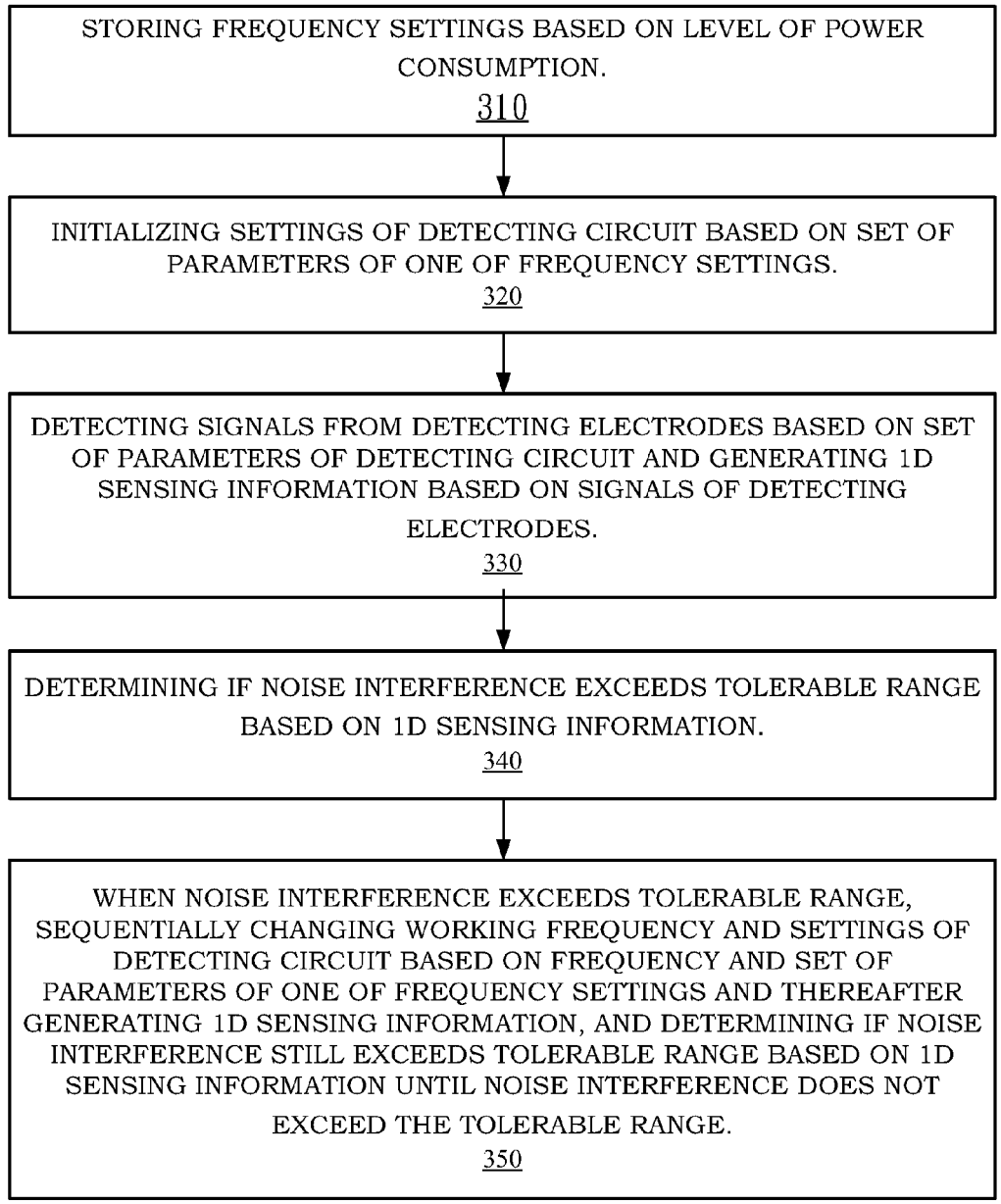
FIGS. 3A and 3B is a flowchart illustrating a detection method for the capacitive touch screen according to the present invention.

According to the above, the present invention proposes a detecting method for the capacitive touch screen. Referring to FIG. 3A, first, in step 310, a plurality of frequency settings are stored based on the levels of power consumption. Each frequency setting corresponds to a driving mode of a driving potential, and each frequency setting has a frequency and a set of parameters, wherein there are at least one type of driving potential. Next, in step 320, the setting of the detecting circuit is initialized based on the set of parameter of one of the frequency settings, and in step 330, signals of the detecting electrodes are detected by the detecting circuit based on a set of parameters of the detecting circuit, and 1D sensing information is generated from the signals of the detecting electrodes. Then, in step 340, it is determined whether noise interference exceeds a tolerable range based on the 1D sensing information. Thereafter, in step 350, when the noise interference exceeds the tolerable range, the working frequency and the setting of the detecting circuit are changed according to the frequency and the set of parameter of one of the frequency settings, and 1D sensing information is generated, and then it is again determined whether the noise interference exceeds the tolerable range based on the 1D sensing information. This step is repeated until the noise interference is within the tolerable range. Alternatively, in step 360 of FIG. 3B, when the noise interference exceeds the tolerable range, the working frequency and the setting of the detecting circuit are changed according to the frequency and the set of parameter of every of the frequency settings, and 1D sensing information is generated and then the noise interference is determined based on the 1D sensing information, and the working frequency and the setting of the detecting circuit are changed to the frequency and the set of parameter of the frequency setting that is least interfered by noise.

For example, a detecting device for detecting a capacitive touch sensor is proposed according to a best mode of the present invention, which includes a storage circuit 43, a driving circuit 41 and a detecting circuit 42. As described in step 310, the storage circuit 43 includes a plurality of frequency settings 44 stored according to the levels of power consumption. The storage circuit 43 can be a circuit, a memory or a storage media capable of storing electromagnetic records. In an example of the present invention, the frequency settings 44 can be implemented as a lookup table. In addition, the frequency settings 44 can also store a power consumption parameter.

The driving circuit 41 can be an integration of several circuits, including, but not limited to, the clock circuit 11, the PWM circuit 12, the driving switch 131, the detecting switch 132 and the driving selecting circuit 141. The circuits listed in this example is merely for illustration purpose, and the driving circuit 41 may only include some of the circuits or add more circuits; the present invention is not limited as such. The driving circuit is used to provide a driving signal to at least one driving electrode 151 of a capacitive touch screen according to a working frequency, wherein the capacitive touch screen includes a plurality of driving electrodes 151 and a plurality of detecting electrodes 152

Figure 3B:
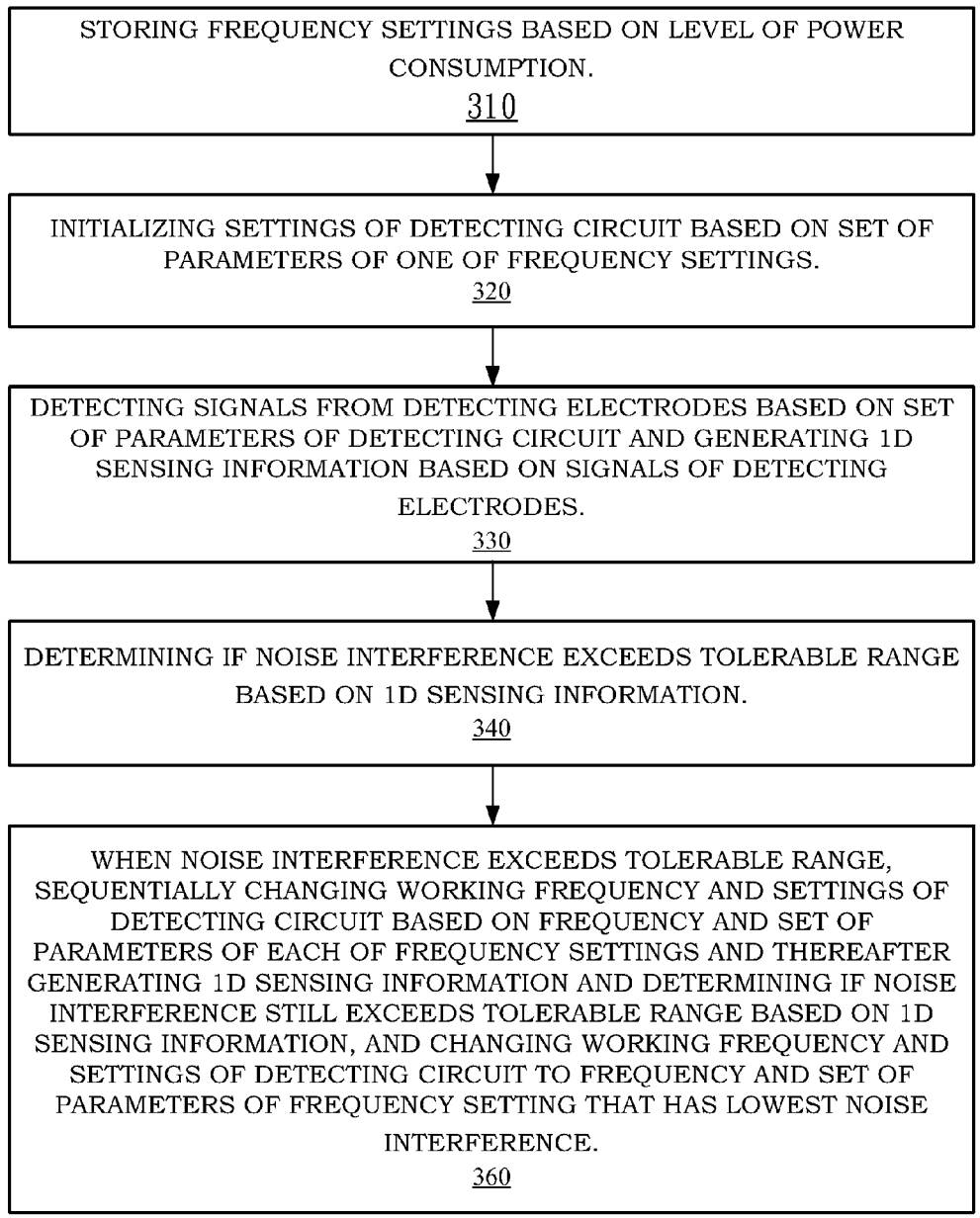
Figure 4:
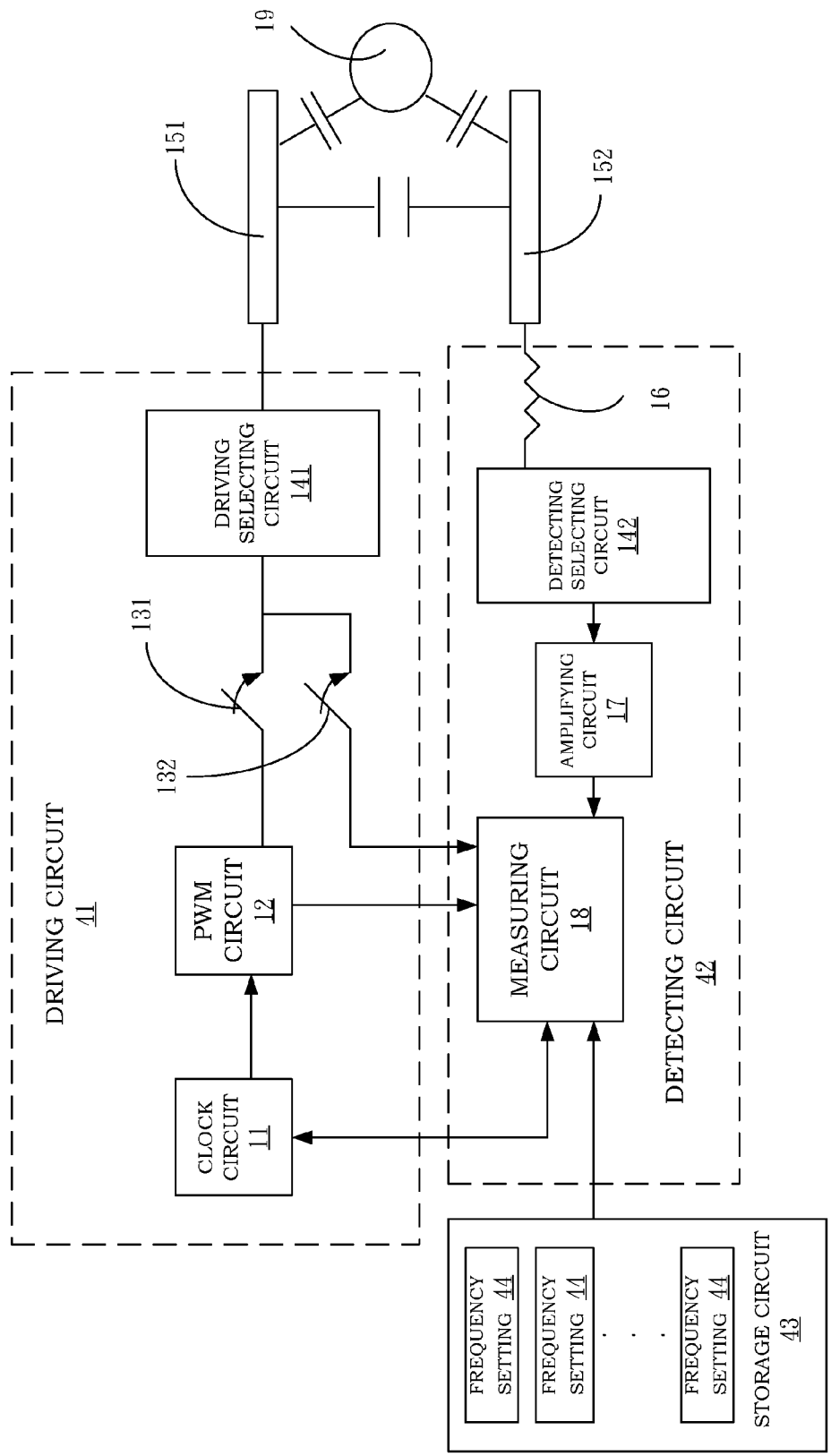

The detecting circuit 42 can be an integration of several circuits, including, but not limited to, the measuring circuit 18, the amplifying circuit 17, the detecting selecting circuit 142, and even the variable resistor 16. The circuits listed in this example is merely for illustration purpose, and the detecting circuit 42 may only include some of the circuits or add more circuits; the present invention is not limited as such. Furthermore, the detecting circuit 42 may further include performing the steps 320 to 340, and step 350 or step 360. In the example of FIG. 3B, the frequency settings are not necessarily stored according to the levels of power consumption.

As previously described, the 1D sensing information for determining whether the noise interference exceeds the tolerable range is generated when no driving signal is provided to the driving electrode(s), for example, when the driving switch 131 is turned off and the detecting switch 132 is turned on.

In an example of the present invention, the at least one driving potential has several types of driving modes, including a single-electrode driving mode and a two-electrode driving mode. In the single-electrode driving mode, the driving signal is provided to only a single driving electrode at any instance, while in the two-electrode driving mode, the driving signal is provided to a pair of driving electrodes simultaneously. The level of power consumption of the single-electrode driving mode is less than the level of power consumption in the two-electrode driving mode. In addition, in the single-electrode driving mode, when every driving electrode is driven by the driving signal, 1D sensing information is generated by the detecting circuit to constitute a full image. In the two-electrode driving mode, when every pair of driving electrodes is driven by the driving signal, 1D sensing information is generated by the detecting circuit to constitute a reduced image. The number of pixels of the reduced image is less than that of the pixels of the full image. Moreover, in the two-electrode driving mode, the detecting circuit may further perform single-electrode driving on electrodes at either end. When the electrodes at either end are driven, signals of all the detecting electrodes are detected to generate 1D sensing information, wherein the 1D sensing information for the electrodes at either side are placed outside the two sides of the reduced image to form the expanded image, and the number of pixels of the expanded image is greater than that of the pixels of the full image.

In another example of the present invention, the driving potential includes a first driving potential and a second driving potential, wherein the level of power consumption for generating the full image in the single-electrode driving mode of the first driving potential>the level of power consumption for generating the reduced image in the two-electrode driving mode of the first driving potential>the level of power consumption for generating the full image in the single-electrode driving mode of the second driving potential.

In yet another example of the present invention, the driving potential includes a first driving potential and a second driving potential, wherein the level of power consumption for generating the full image in the single-electrode driving mode of the first driving potential>the level of power consumption for generating the full image in the single-electrode driving mode of the second driving potential.

Moreover, in an example of the present invention, the signal of each detecting electrode is passed through a variable resistor before providing to the detecting circuit. The detecting circuit sets the impedance of the variable resistor according to the set of parameter of one of the frequency settings. In addition, the signals of the detecting electrodes are first amplified by at least one amplifier before being detected. The detecting circuit sets the gain of the amplifier according to the set of parameter of one of the frequency settings. In addition, the driving signal is generated according to the set of parameter of one of the frequency settings.

In an example of the present invention, each value of 1D sensing information is generated according to the signals of the detecting electrodes in a defined period, wherein the defined period is determined according to the set of parameter of one of the frequency settings. In an example of the present invention, each value of 1D sensing information is generated according to the signals of the detecting electrodes with at least one defined phase, wherein the defined phase is determined according to the set of parameter of one of the frequency settings.

Figure 5:
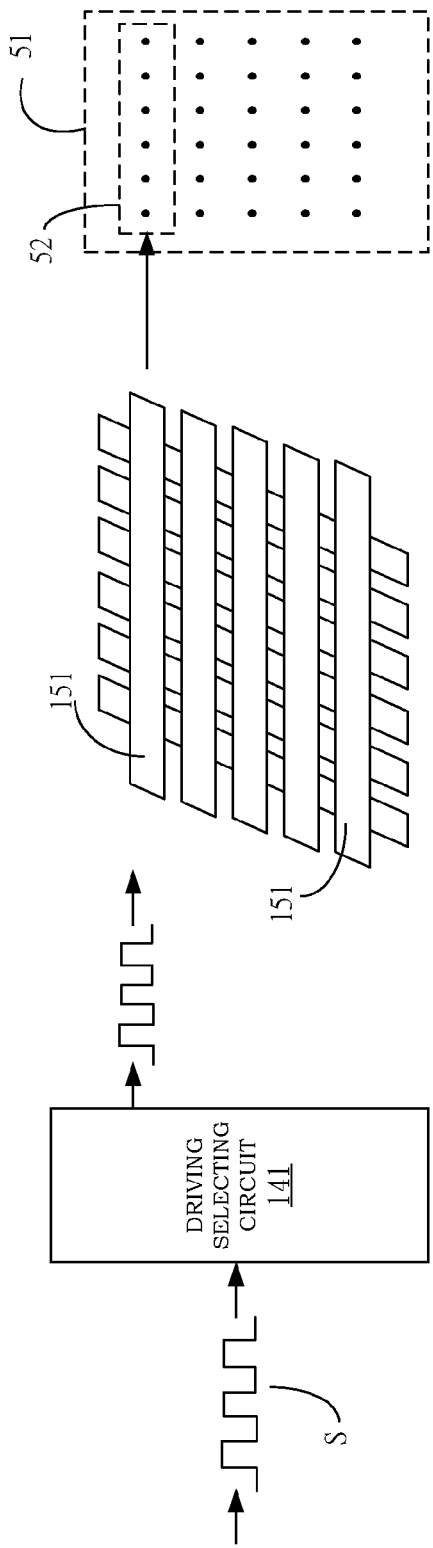
FIG. 5 is a schematic diagram illustrating the generation of a full image.

Referring to FIG. 5, a schematic diagram illustrating the single-electrode driving mode proposed by the present invention is shown. A driving signal S is sequentially provided to a first driving electrode, a second driving electrode . . . and the last driving electrode. 1D sensing information for single-electrode driving 52 is generated when each driving electrode is driven by the driving signal S. All the 1D sensing information for single-electrode driving 52 are combined together to constitute a full image 51. Each value of the full image 51 corresponds to changes in capacitive coupling of one of the electrode intersections.

Furthermore, each value of the full image 51 corresponds to a location of one of the intersections. For example, the center location of each driving electrode corresponds to a first 1D coordinate, while the center location of each detecting electrode corresponds to a second 1D coordinate. The first 1D coordinate can be one of a lateral (e.g. horizontal or X-axis) coordinate and longitudinal (e.g. vertical or Y-axis) coordinate, while the second 1D coordinate can be the other one of a lateral (e.g. horizontal or X-axis) coordinate and longitudinal (e.g. vertical or Y-axis) coordinate. Each intersection corresponds to a 2D coordinate of a driving electrode and a detecting electrode intersecting thereat. The 2D coordinate is made up of the first 1D coordinate and the second 1D coordinate, for example, (first 1D coordinate, second 1D coordinate) or (second 1D coordinate, first 1D coordinate). In other words, the 1D sensing information generated by each single-electrode driving corresponds to the first 1D coordinate at the center of a driving electrode, wherein each value of the 1D sensing information for single-electrode driving (or each value of the full image) corresponds to a 2D coordinate made up of the first 1D coordinate at the center of the driving electrode and the second 1D coordinate at the center of a detecting electrode. Similarly, each value of the full image corresponds to the center location of one of the intersections, that is, corresponds to a 2D coordinate made up of the first 1D coordinate at the center of a driving electrode and the second 1D coordinate at the center of a detecting electrode.

Figure 6:
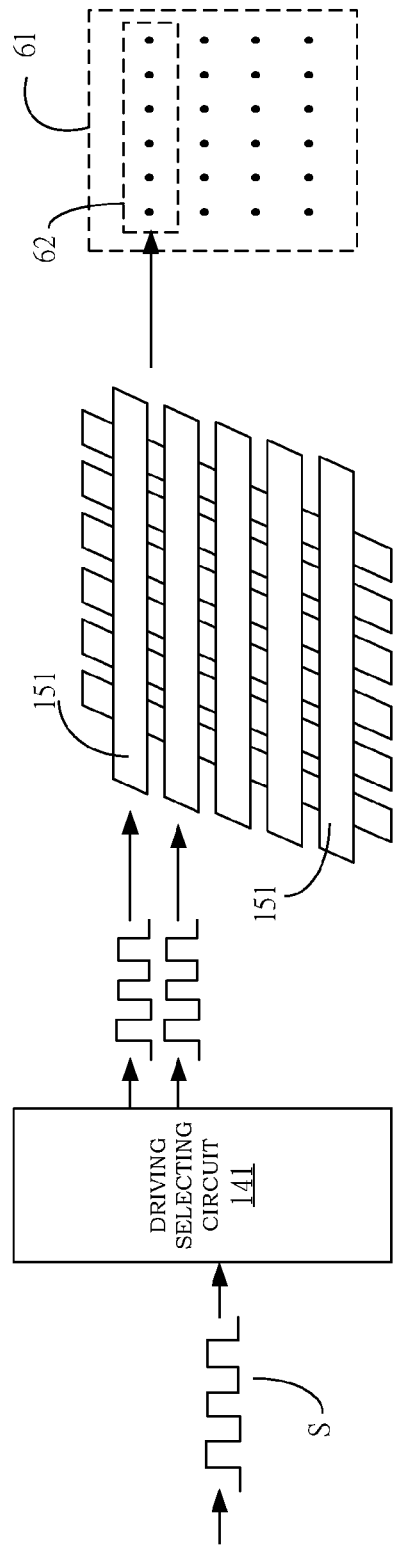
FIG. 6 is a schematic diagram illustrating the generation of a reduced image.

Referring to FIG. 6, a schematic diagram illustrating the two-electrode driving mode proposed by the present invention is shown. A driving signal S is sequentially provided to a first pair of driving electrodes, a second pair of driving electrodes . . . and the last pair of driving electrodes. 1D sensing information for two-electrode driving 62 is generated when each pair of driving electrodes is driven by the driving signal S. In other words, N driving electrodes make up N−1 (multiple) pairs of driving electrodes. All the 1D sensing information for two-electrode driving 62 are combined together to constitute a reduced image 61. The number of values (or pixels) of the reduced image 61 is less than the number of values (or pixels) of the full image 51. In contrast to the full image, each 1D sensing information for two-electrode driving 62 of the reduced image corresponds to a first 1D coordinate of a center location between a pair of driving electrodes, and each value corresponds to a 2D coordinate made up of the first 1D coordinate of the center location between the pair of driving electrodes and a second 1D coordinate at the center of a detecting electrode. In other words, each value of the reduced image corresponds to the location of the center between a pair of intersections, that is, corresponds to a 2D coordinate made up of the first 1D coordinate of the center location between a pair of driving electrodes (or one of several pairs of driving electrodes) and a second 1D coordinate at the center of a detecting electrode.

Referring to FIG. 7A, a schematic diagram illustrating a first side single-electrode driving in the two-electrode driving mode proposed by the present invention is shown. A driving signal S is provided to a driving electrode nearest to a first side of a capacitive touch screen, and first-side 1D sensing information for single-electrode driving 721 is generated when the driving electrode nearest to the first side of the capacitive touch screen is being driven by the driving signal S. Now referring to FIG. 7B, a schematic diagram illustrating a second side single-electrode driving in the two-electrode driving mode proposed by the present invention is shown. A driving signal S is provided to a driving electrode nearest to a second side of a capacitive touch screen, and second-side 1D sensing information for single-electrode driving 722 is generated when the driving electrode nearest to the second side of the capacitive touch screen is being driven by the driving signal S. The 1D sensing information for single-electrode driving 721 and 722 generated when the driving electrodes nearest to the first and second sides of the capacitive touch screen are being driven are placed outside the first and second sides of the reduced image 61 mentioned before, respectively, to form an expanded image 71. The number of values (or pixels) in the expanded image 71 is greater than the number of values (or pixels) in the full image 51. In an example of the present invention, the first-side 1D sensing information for single-electrode driving 721 is generated first, then the reduced image 61 is generated, and then the second-side 1D sensing information for single-electrode driving 722 is generated to construct the expanded image 71. In another example of the present invention, the reduced image 61 is generated first, and thereafter, the first- and second-side 1D sensing information for single-electrode driving 721 and 722 are generated to construct the expanded image 71.

In other words, the expanded image is made up of the first-side 1D sensing information for single-electrode driving, the reduced image and the second-side 1D sensing information for single-electrode driving. Since the values in the reduced image 61 are two-electrode driven, so the average magnitude will be greater than that of the first- and second-side 1D sensing information for single-electrode driving. In an example of the present invention, the values of the first- and second-side 1D sensing information for single-electrode driving 721 and 722 are first amplified by a ratio before placing outside the first and second sides of the reduced image 61. This ratio can be a predetermined multiple greater than 1, or based on the ratio between the values of the 1D sensing information for two-electrode driving and the values of the 1D sensing information for single-electrode driving, for example, the ratio between the sum (or average) of all the values of the first-side 1D sensing information for single-electrode driving 721 and the sum (or average) of all the values of the 1D sensing information 62 near the first side in the reduced image, and the values of the first-side 1D sensing information for single-electrode driving 721 are amplified by this ratio before placing outside the first side of the reduced image 61. Similarly, the values of the second-side 1D sensing information for single-electrode driving 722 are amplified by this ratio before placing outside the second side of the reduced image 61. Alternatively, for example, said ratio is the ratio between the sum (or average) of all the values in the reduced image 61 and the sum (or average) of all the values of the first- and second-side 1D sensing information for single-electrode driving 721 and 722.

In the single-electrode driving mode, each value (or pixel) of the full image corresponds to a 2D location (or coordinate) of an intersection made up of the first 1D location (or coordinate) corresponding to the driving electrode and the second 1D location (or coordinate) corresponding to the detecting electrode intersecting at the intersection, for example (first 1D location, second 1D location) or (second 1D location, first 1D location). A single external conductive object may be capacitively coupled to one or more intersections. The intersection(s) capacitively coupled to the external conductive object generate(s) changes in capacitive coupling, which are reflected in the corresponding value(s) in the full image, that is, in the corresponding value(s) in the full image corresponding to the external conductive object. Thus, based on the corresponding values and 2D coordinates in the full image corresponding to the external conductive object, a centroid location (a 2D coordinate) of the external conductive object can be calculated.

In an example of the present invention, in the single-electrode driving mode, the 1D location corresponding to each electrode (driving and detecting electrodes) is the location of the center of the electrode. Based on another example of the present invention, in the two-electrode driving mode, the 1D location corresponding to each pair of electrodes (driving and detecting electrodes) is the location of the center between the two electrodes.

In the reduced image, a first 1D sensing information corresponds to the center location of a first pair of driving electrodes, that is, a first 1D location of the center between a first and a second driving electrodes (the first pair of driving electrodes). If the centroid location is simply calculated, a location can be calculated only in the range from the center of the first pair of driving electrodes to the center of the last pair of driving electrodes. The range in which the location is calculated based on the reduced image lacks a range from the center location of the first driving electrode to the center location (the first 1D location of the center) of the first pair of driving electrodes, and a range from the center location of the last pair of driving electrodes to the center location of the last driving electrode.

In contrast to the reduced image, in the expanded image, the first- and second-side 1D sensing information correspond to the center locations of the first and last driving electrodes, respectively. Thus, the range in which the location is calculated based on the expanded image, compared to that calculated based on the reduced image, further includes the range from the center location of the first driving electrode to the center location (the first 1D location of the center) of the first pair of driving electrodes, and the range from the center location of the last pair of driving electrodes to the center location of the last driving electrode. In other words, the range in which the location is calculated based on the expanded image covers the range in which the location is calculated based on the full image.

Similarly, the two-electrode driving mode can be further expanded to a multiple-electrode driving mode, that is, multiple driving electrodes are simultaneously driven. In other words, the driving signal is simultaneously provided to multiple (or all) driving electrodes in a set of driving electrodes. The number of driving electrodes in a set of driving electrodes may, for example, be two, three or four. The multiple-electrode driving mode includes the two-electrode driving mode, but not the single-electrode driving mode.

Figure 8:
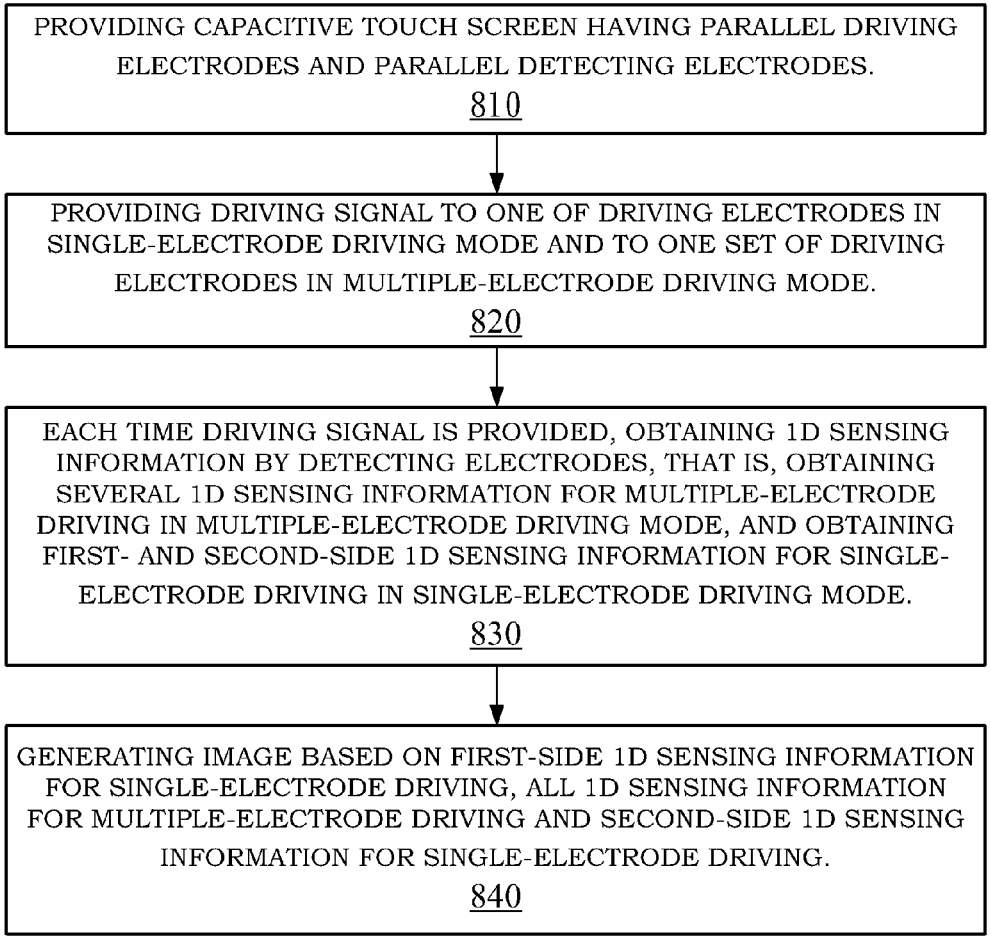
FIG. 8 is a flowchart illustrating the generation of the expanded image according to the present invention.

Referring to FIG. 8, a detecting method for a capacitive touch screen proposed by the present invention is shown. In step 810, a capacitive touch screen including a plurality of parallel driving electrodes and a plurality of parallel detecting electrodes is provided, wherein the driving electrodes and the detecting electrodes (e.g. the driving electrodes 151 and the detecting electrodes 152) cross each other at intersections. Next, in step 820, one and a set of driving electrodes among the plurality of driving electrodes is/are provided with a driving signal in the single-electrode driving mode and the multiple-electrode driving mode, respectively, that is, one of the driving electrodes are driven by the driving signal at a time in the single-electrode driving mode, while a set of driving electrodes in the driving electrodes are simultaneously driven by the driving signal at a time in the multiple-electrode driving mode, wherein apart from the last N driving electrodes, each driving electrodes and two successive driving electrodes form the set of driving electrodes to be driven simultaneously, and N is the number of the set minus one. The driving signal can be provided by the driving circuit 41 described before. Thereafter, in step 830, each time the driving signal is provided, 1D sensing information is obtained via the detecting electrodes; more specifically, a plurality of 1D sensing information for multiple-electrode driving are obtained in the multiple-electrode driving mode and first- and second-side 1D sensing information for single-electrode driving are obtained in the single-electrode driving mode. For example, in the multiple-electrode driving mode, one 1D sensing information for multiple-electrode driving is obtained when each set of driving electrodes are provided with the driving signal. Alternatively, for example, in the single-electrode driving mode, one first-side 1D sensing information for single-electrode driving and one second-side 1D sensing information for single-electrode driving are obtained when the first driving electrode and the last driving electrode are provided with the driving signal, respectively. The 1D sensing information can be obtained by the detecting circuit 42 described above. The 1D sensing information thus includes the 1D sensing information for multiple-electrode driving (reduced image) and the first- and second-side 1D sensing information for single-electrode driving. Then, in step 840, an image (an expanded image) is generated according to the first-side 1D sensing information for single-electrode driving, all the 1D sensing information for multiple-electrode driving and the second-side 1D sensing information for single-electrode driving. Step 840 can be performed by the control circuit described before.

As described before, the potential of the driving signal in the single-electrode driving mode is not necessary the same as the potential of the driving signal in the multiple-electrode driving mode; they can be the same or different. For example, the single-electrode driving is performed with a first AC potential larger than a second AC potential for the multiple-electrode driving. The ratio of the first AC potential to the second AC potential can be a predetermined ratio. In addition, in step 840, the image is generated based on all the values of the first- and second-side 1D sensing information for single-electrode driving being multiplied by the same predetermined ratio or different predetermined ratios. Moreover, the frequency of the driving signal in the single-electrode driving mode can be different from that of the driving signal in the multiple-electrode driving mode.

The number of driving electrodes in the set of driving electrodes can be two, three or more; the present invention is not limited to these.

In a preferred mode of the present invention, the number of driving electrodes in the set of driving electrodes is two. When the number of driving electrodes in the set of driving electrodes is two, each driving electrode corresponds to a first 1D coordinate, wherein 1D sensing information driven by each group (or pair) of the electrodes corresponds to a first 1D coordinate of the center between the pair of driving electrodes among the plurality of driving electrodes, and the first- and second-side 1D sensing information for single-electrode driving correspond to first 1D coordinates of the first and the last driving electrodes, respectively.

Similarly, when the number of driving electrodes in the set of driving electrodes is more than two, each driving electrode corresponds to a first 1D coordinate, wherein 1D sensing information driven by each set of multiple electrodes corresponds to a first 1D coordinate of the center between two driving electrode separated the furthest in the set of driving electrodes, and the first- and second-side 1D sensing information for single-electrode driving correspond to first 1D coordinates of the first and the last driving electrodes, respectively.

Moreover, each detecting electrode corresponds to a second 1D coordinate, and each value of each 1D sensing information corresponds to the second 1D coordinate of one of the detecting electrodes.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A detecting device for a capacitive touch screen, comprising:
    a storage circuit for storing a plurality of frequency settings based on power consumption of the capacitive touch screen, each frequency setting corresponding to one of a plurality of driving modes, and each frequency setting including a frequency and a set of parameters, wherein each driving mode corresponds to a driving potential with a working frequency;
    a driving circuit for providing a driving signal to at least one driving electrode of the capacitive touch screen according to the working frequency, wherein the capacitive touch screen includes a plurality of driving electrodes and a plurality of detecting electrodes crossing each other at a plurality of intersections; and
    a detecting circuit including:
    initializing settings of the detecting circuit based on the set of parameters of one of the frequency settings;
    detecting signals from the detecting electrodes based on a set of parameters of the detecting circuit and generating a 1D sensing information based on the signals from the detecting electrodes;
    determining if one, the sum, or the average of all the values of the 1D sensing information during noise detection exceeds a tolerable threshold; and
    if the tolerable threshold is exceeded, including:
    sequentially changing the working frequency and the settings of the detecting circuit based on the frequency and the set of parameters of one of the frequency settings and thereafter generating a 1D sensing information and determining if the tolerable threshold is still exceeded until the tolerable threshold is not exceeded; or
    sequentially changing the working frequency and the settings of the detecting circuit based on the frequency and the set of parameters of each of the frequency settings and thereafter generating a 1D sensing information and determining if the tolerable threshold is still exceeded, and changing the working frequency and the settings of the detecting circuit to the frequency and the set of parameters of the frequency setting that has the lowest noise interference.

2. The detecting device of claim 1, wherein the 1D sensing information used for determining if the tolerable threshold is exceeded is generated when no driving signal is provided to the driving electrodes.

3. The detecting device of claim 1, wherein one driving potential includes several driving modes, the driving mode includes a single-electrode driving mode and a two-electrode driving mode, wherein in the single-electrode driving mode, the driving signal is provided to only one of the driving electrodes at a time, while in the two-electrode driving mode, the driving signal is simultaneously provided to a pair of the driving electrodes at a time.

4. The detecting device of claim 3, wherein the power consumption for the single-electrode driving mode is less than the power consumption for the two-electrode driving mode.

5. The detecting device of claim 3, wherein in the single-electrode driving mode, the detecting circuit generates the 1D sensing information when each driving electrode is provided with the driving signal, forming a full image, and wherein in the two-electrode driving mode, the detecting circuit generates the 1D sensing information when each pair of the driving electrodes is provided with the driving signal, forming a reduced image, wherein the number of pixels in the reduced image is smaller than the number of pixels in the full image.

6. The detecting device of claim 5, wherein in the two-electrode driving mode, the detecting circuit further includes driving electrodes at both sides, and when the single driving electrode at either side is driven, detecting the signals of all the detecting electrodes to generate a 1D sensing information, wherein the two 1D sensing information generated from the driving of the electrodes at both sides are placed outside either end of the reduced image to construct an expanded image, and the number of pixels in the expanded image is greater than the number of pixels in the full image.

7. The detecting device of claim 1, wherein the driving potential includes a first driving potential and a second driving potential, wherein the power consumption for generating the full image in the single-electrode driving mode of the first driving potential>the power consumption for generating the reduced image in the two-electrode driving mode of the first driving potential>the power consumption for generating the full image in the single-electrode driving mode of the second driving potential.

8. The detecting device of claim 1, wherein the driving potential includes a first driving potential and a second driving potential, wherein the power consumption for generating the full image in the single-electrode driving mode of the first driving potential>the power consumption for generating the full image in the single-electrode driving mode of the second driving potential.

9. The detecting device of claim 1, wherein the signal of each detecting electrode is passed through a variable resistor before providing to the detecting circuit, the detecting circuit sets an impedance of the variable resistor based on the set of parameter of one of the frequency settings.

10. The detecting device of claim 1, wherein the signals of the detecting electrodes are amplified by at least one amplifier before being detected by the detecting circuit, the detecting circuit sets a gain of the amplifier based on the set of parameter of one of the frequency settings.

11. The detecting device of claim 1, wherein the driving signal is generated based on the set of parameter of one of the frequency settings.

12. The detecting device of claim 1, wherein each value of the 1D sensing information is generated based on the signals of the detecting electrodes in a predetermined period, wherein the predetermined period is based on the set of parameter of one of the frequency settings.

13. The detecting device of claim 1, wherein each value of the 1D sensing information is generated based on the signals of the detecting electrodes in a predetermined phase, wherein the predetermined phase is based on the set of parameter of one of the frequency settings.

14. A detecting method for a capacitive touch screen, comprising:
storing a plurality of frequency settings based on a-level of power consumption of the capacitive touch screen, each frequency setting corresponding to one of a plurality of driving modes, and each frequency setting including a frequency and a set of parameters, wherein each driving mode corresponds to a driving potential with a working frequency;
providing a driving signal to at least one driving electrode of the capacitive touch screen according to the working frequency, wherein the capacitive touch screen includes a plurality of driving electrodes and a plurality of detecting electrodes crossing each other at a plurality of intersections; and
initializing settings of a detecting circuit based on the set of parameters of one of the frequency settings;
detecting signals from the detecting electrodes based on a set of parameters of the detecting circuit and generating a 1D sensing information based on the signals from the detecting electrodes;
determining if one, the sum, or the average of all the values of the 1D sensing information during noise detection exceeds a tolerable threshold; and
if the tolerable threshold is exceeded, including:
sequentially changing the working frequency and the settings of the detecting circuit based on the frequency and the set of parameters of one of the frequency settings and thereafter generating a 1D sensing information and determining if the tolerable threshold is still exceeded until the tolerable threshold is not exceeded; or
sequentially changing the working frequency and the settings of the detecting circuit based on the frequency and the set of parameters of each of the frequency settings and thereafter generating a 1D sensing information and determining if the tolerable threshold is still exceeded, and changing the working frequency and the settings of the detecting circuit to the frequency and the set of parameters of the frequency setting that has the lowest noise interference.

15. The detecting method of claim 14, wherein the 1D sensing information used for determining if the tolerable threshold is exceeded is generated when no driving signal is provided to the driving electrodes.

16. The detecting method of claim 14, wherein one driving potential includes several driving modes, the driving mode includes a single-electrode driving mode and a two-electrode driving mode, wherein in the single-electrode driving mode, the driving signal is provided to only one of the driving electrodes at a time, while in the two-electrode driving mode, the driving signal is simultaneously provided to a pair of the driving electrodes at a time.

17. The detecting method of claim 16, wherein the power consumption for the single-electrode driving mode is less than the power consumption for the two-electrode driving mode.

18. The detecting method of claim 16, wherein in the single-electrode driving mode, the detecting circuit generates the 1D sensing information when each driving electrode is provided with the driving signal, forming a full image, and wherein in the two-electrode driving mode, the detecting circuit generates the 1D sensing information when each pair of the driving electrodes is provided with the driving signal, forming a reduced image, wherein the number of pixels in the reduced image is smaller than the number of pixels in the full image.

19. The detecting method of claim 18, wherein in the two-electrode driving mode, the detecting circuit further includes driving electrodes at both sides, and when the single driving electrode at either side is driven, detecting the signals of all the detecting electrodes to generate a 1D sensing information, wherein the two 1D sensing information generated from the driving of the electrodes at both sides are placed outside either end of the reduced image to construct an expanded image, and the number of pixels in the expanded image is greater than the number of pixels in the full image.

20. The detecting method of claim 14, wherein the driving potential includes a first driving potential and a second driving potential, wherein the level of power consumption for generating the full image in the single-electrode driving mode of the first driving potential>the power consumption for generating the reduced image in the two-electrode driving mode of the first driving potential>the power consumption for generating the full image in the single-electrode driving mode of the second driving potential.

21. The detecting method of claim 14, wherein the driving potential includes a first driving potential and a second driving potential, wherein the level of power consumption for generating the full image in the single-electrode driving mode of the first driving potential>the power consumption for generating the full image in the single-electrode driving mode of the second driving potential.

22. The detecting method of claim 14, wherein the signal of each detecting electrode is passed through a variable resistor before providing to the detecting circuit, the detecting circuit sets an impedance of the variable resistor based on the set of parameter of one of the frequency settings.

23. The detecting method of claim 14, wherein the signals of the detecting electrodes are amplified by at least one amplifier before being detected by the detecting circuit, the detecting circuit sets a gain of the amplifier based on the set of parameter of one of the frequency settings.

24. The detecting method of claim 14, wherein the driving signal is generated based on the set of parameter of one of the frequency settings.

25. The detecting method of claim 14, wherein each value of the 1D sensing information is generated based on the signals of the detecting electrodes in a predetermined period, wherein the predetermined period is based on the set of parameter of one of the frequency settings.

26. The detecting method of claim 14, wherein each value of the 1D sensing information is generated based on the signals of the detecting electrodes in a predetermined phase, wherein the predetermined phase is based on the set of parameter of one of the frequency settings.

* * * * *